United States Patent
Cho et al.

(10) Patent No.: US 7,369,178 B2
(45) Date of Patent: May 6, 2008

(54) CAMERA LENS ASSEMBLY FOR A PORTABLE TERMINAL

(75) Inventors: Jin-Hee Cho, Suwon-si (KR); Byung-Sik Kim, Suwon-si (KR); Sung-Soo Go, Seoul (KR); Chang-Soo Lee, Incheon (KR); Seung-Min Park, Seoul (KR); Jun-Sang Park, Anyang-si (KR); Sung-Kwon Kim, Gwangmyeong-si (KR); Jun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 744 days.

(21) Appl. No.: 10/838,073

(22) Filed: May 3, 2004

(65) Prior Publication Data

US 2004/0246371 A1 Dec. 9, 2004

(30) Foreign Application Priority Data

Jun. 5, 2003 (KR) .................. 10-2003-0036391
Sep. 2, 2003 (KR) .................. 10-2003-0061237

(51) Int. Cl.
*H04N 5/225* (2006.01)
(52) U.S. Cl. .................. 348/375; 348/552; 455/556
(58) Field of Classification Search .............. 348/375, 348/552, 376, 373, 207.1; 455/66.1, 556.1, 455/556.2, 566; 396/346
See application file for complete search history.

(56) References Cited

U.S. PATENT DOCUMENTS

| 5,491,507 A | 2/1996 | Umezawa et al. |
| 6,118,653 A * | 9/2000 | Kim ..................... 361/683 |
| 6,933,981 B1 * | 8/2005 | Kishida et al. ........... 348/375 |
| 7,184,092 B2 * | 2/2007 | Lim ..................... 348/376 |
| 7,193,653 B2 * | 3/2007 | Lee ..................... 348/373 |
| 2001/0036845 A1 | 11/2001 | Park |

FOREIGN PATENT DOCUMENTS

| EP | 0 930 770 | 7/1999 |
| JP | 2003-163824 | * 11/2001 |
| WO | WO 02/076067 | 9/2002 |

* cited by examiner

*Primary Examiner*—Ngoc-Yen Vu
*Assistant Examiner*—Kent Wang
(74) *Attorney, Agent, or Firm*—The Farrell Law Firm, PC

(57) ABSTRACT

A camera lens assembly for a portable terminal. The camera lens assembly comprises a cylindrical housing having a receiving space extended in the longitudinal direction thereof, a camera holder inserted into or drawn out from the housing at one end of the housing, a bracket fixed to the end of the camera holder and linearly reciprocated in the housing, a guide plate linearly reciprocated on the bracket in the direction perpendicular to the longitudinal direction of the bracket and having a guide groove formed in the shape of a prescribed figure, a supporting cap attached to the other end of the housing and having a guide protrusion formed at the inner circumferential surface thereof and slidably moved along the guide groove for stopping the linear movement of the bracket at least once, and a spring supported by the supporting cap at one end thereof for applying an elastic force to the camera holder in the direction of drawing out the camera holder from the housing.

10 Claims, 16 Drawing Sheets

CAMERA LENS ASSEMBLY FOR A PORTABLE TERMINAL

PRIORITY

This application claims priority to an application entitled "CAMERA LENS ASSEMBLY FOR PORTABLE TERMINALS", filed in the Korean Intellectual Property Office on Jun. 5, 2003 and assigned Serial No. 2003-36391, and to Korean Application Serial No. 2003/61237 filed in the Korean Intellectual Property Office on Sep. 2, 2003, the contents of which are hereby incorporated by reference.

BACKGROUND OF THE INVENTION

1. Field of the Invention

The present invention relates generally to a portable terminal, and more particularly to a camera lens assembly for a portable terminal.

2. Description of the Related Art

Recently, a number of portable terminals with various functions and designs have been developed as the information communication industry has developed. Commonly, as a result of their physical forms, the portable terminals are classified into a bar-type terminal, a flip-type terminal having a flip cover, and a folder-type terminal having a folder part rotatably attached to the main body of the terminal in the range of prescribed angles.

Such portable terminals have various functions, such as transmitting/receiving e-mails or data, playing Internet games, or transmitting characters, in addition to in addition to a basic function, i.e., an audio communication function. Also, service ranges of the portable terminals, such as image communication between users of the portable terminals or a motion picture service, have been increasingly expanded recently as portable terminals adopt new communication technologies, such as CDMA 1x EVDO. As a mobile communication service area has increased, the portable terminal is further provided with various functional units, such as a camera lens. More specifically, as image communication and motion picture service using the portable terminal is expanded, the camera lens is becoming one of the indispensable components of the portable terminal.

FIG. 1 is a perspective view illustrating a portable terminal 100 with a conventional camera lens assembly 200. As illustrated in FIG. 1, the conventional camera lens assembly 200 is mounted in one of two side hinged arms 115 of the portable terminal 100. The portable terminal 100 comprises a main body 101 and a folder part 102 rotatably attached to the main body 101.

On the front surface of the main body 101 are arranged a keypad 111 comprising a plurality of key buttons, and a microphone unit 113, which is disposed at one side of the keypad 111. At the upper right end of the main body 101 is attached an antenna unit 119.

The folder part 102 comprises a display unit 121 arranged on the inner surface thereof, which is opposite to the main body 101, and a speaker unit 123 disposed at one side of the display unit 121.

The main body 101 is provided at the upper end thereof with a pair of side hinged arms 115, which are opposite to each other while being spaced apart from each other. At one end of the folder part 102 is formed a center hinged arm 125, which is rotatably disposed between the side hinged arms 115. Consequently, the folder part 102 is rotatably attached to the main body 101. The camera lens assembly 200 is rotatably mounted in one of the side hinged arms 115 of the main body 101.

FIG. 2 is an exploded perspective view of the camera lens assembly 200 of the portable terminal 100 illustrated in FIG. 1. As illustrated in FIG. 2, the camera lens assembly 200 comprises a lens housing 201, a front cover 202, a lens unit 203, a rear cover 204, and a camera shaft 205. As described above, the camera lens assembly is rotatably mounted in one of the side hinged arms 115 of the main body 101.

The lens housing 201 is formed in the shape of a cylinder having open ends. Inside the lens housing 201 may be mounted ribs (not illustrated) for supporting a camera lens. The front cover 202 is attached to one end of the lens housing 201. One end of the camera lens 231 is fixed to the inside of the front cover 202. The front cover 202 has an exposure opening 221 for exposing the camera lens 231. The exposure opening 221 is closed by means of a window 229 made of a transparent material. The rear cover 204 is fixed to the other end of the lens housing 201 by means of a fixing member, such as a screw 269. From one side of the rear cover 204 is extended a coupling shaft having a grooved coupling part 249 formed at the end thereof. The rear cover 204 serves to close the other end of the lens housing 201. Also, the rear cover 204 provides a passage through which a flexible printed circuit 233 extended from one end of the camera lens 231 passes. The camera shaft 205 has a thoughhole 251, though which the coupling shaft of the rear cover 204 is inserted. Consequently, the end of the rear cover 204, where the grooved coupling part 249 is formed, is protruded toward the end of the camera shaft 205. The end of the rear cover 204 is inserted through a diaphragm (not illustrated) disposed in the side hinged arm 115, enabling an E-ring 263 to be fitted on the grooved coupling part 249 of the rear cover 204. Accordingly, the camera lens assembly 200 is rotatably mounted in one of the side hinged arms 115.

Between the rear cover 204 and the camera shaft 205 is disposed a spring washer 261, which serves to tightly push the camera shaft 205 to the diaphragm in the side hinged arm 115. Consequently, the camera lens assembly 200 is rotated while the E-ring 263 and the end of the camera shaft 205 are tightly pushed to both sides of the diaphragm, respectively, so that the camera lens assembly 200 is stably rotatable.

The camera lens assembly 200 of the portable terminal 100 with the above-stated construction is rotated about a rotating axis A extended in the lateral direction of the main body 101. As a result, it is possible to take pictures using the camera lens assembly 200 while it is turned toward the front or the rear of the main body 101.

In the conventional camera lens assembly, however, the lens housing is not easily and conveniently rotated. As a result, controlling picture-taking angles is difficult. Also, the exposure opening is always exposed to the outside with the result that the camera lens may be easily contaminated due to shock, scratches, or foreign matter, and therefore the camera lens assembly may be damaged. It may be possible to adopt an additional component for protecting the camera lens. In this case, however, the volume of the conventional camera lens assembly will be increased.

SUMMARY OF THE INVENTION

Therefore, the present invention has been designed in view of the above and other problems, and it is an object of the present invention to provide a camera lens assembly for portable terminals that is capable of easily controlling picture-taking angles.

It is another object of the present invention to provide a camera lens assembly for portable terminals that is capable of protecting an exposure opening from an external shock or scratch.

In accordance with one aspect of the present invention, the above and other objects can be accomplished by a camera lens assembly for a portable terminal, comprising: a cylindrical housing having a receiving space extended in the longitudinal direction thereof; a camera holder inserted into or drawn out from the housing at one end of the housing; a bracket fixed to the end of the camera holder and linearly reciprocated in the housing; a guide plate linearly reciprocated on the bracket in the direction perpendicular to the longitudinal direction of the bracket, the guide plate having a guide groove formed at one side thereof, the guide groove being formed in the shape of a prescribed figure; a supporting cap attached to the other end of the housing and having a guide protrusion formed at the inner circumferential surface thereof, the guide protrusion being slidably moved along the guide groove for stopping the linear movement of the bracket at least once; and a spring supported by the supporting cap at one end thereof for applying an elastic force to the camera holder in the direction of drawing out the camera holder from the housing.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Figure 1:
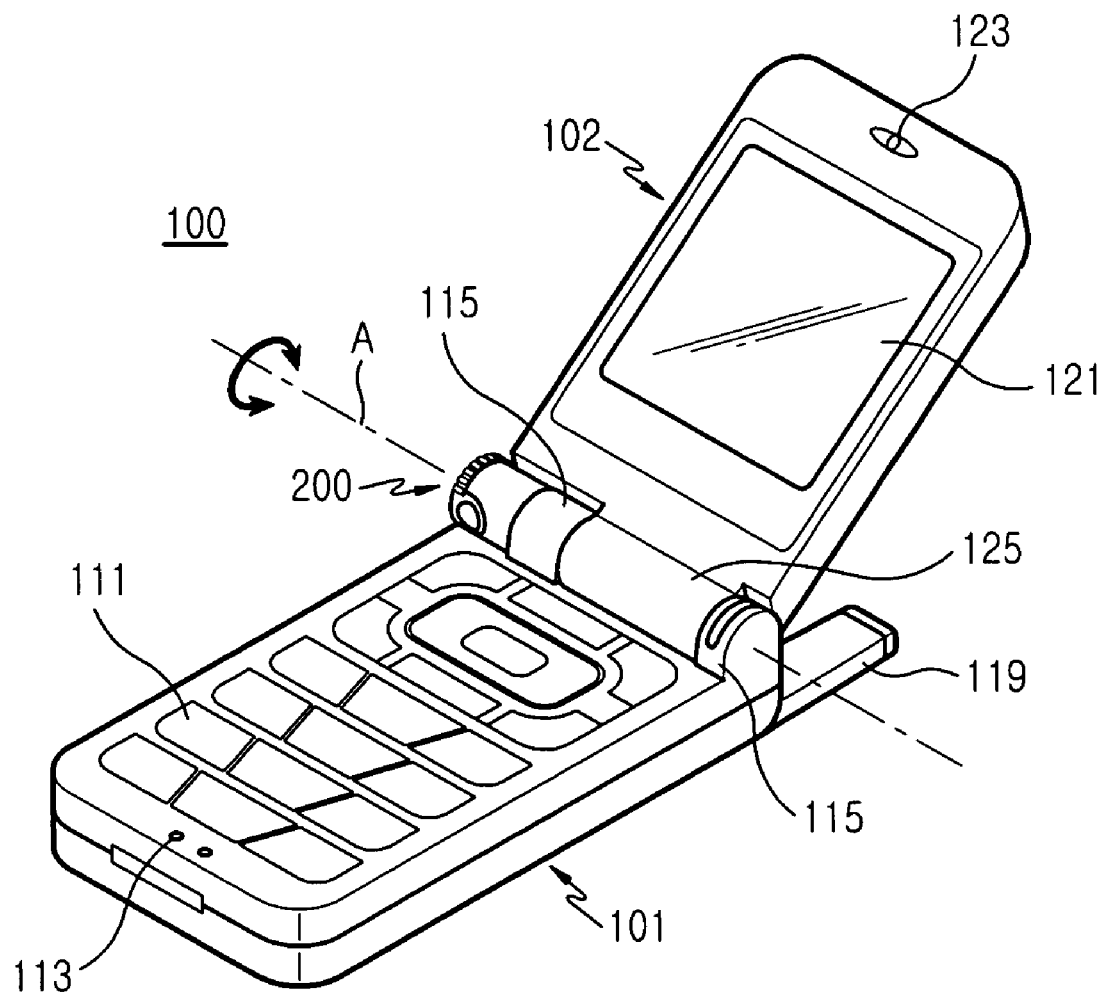
FIG. 1 is a perspective view illustrating a portable terminal including a conventional camera lens assembly.
Figure 2:
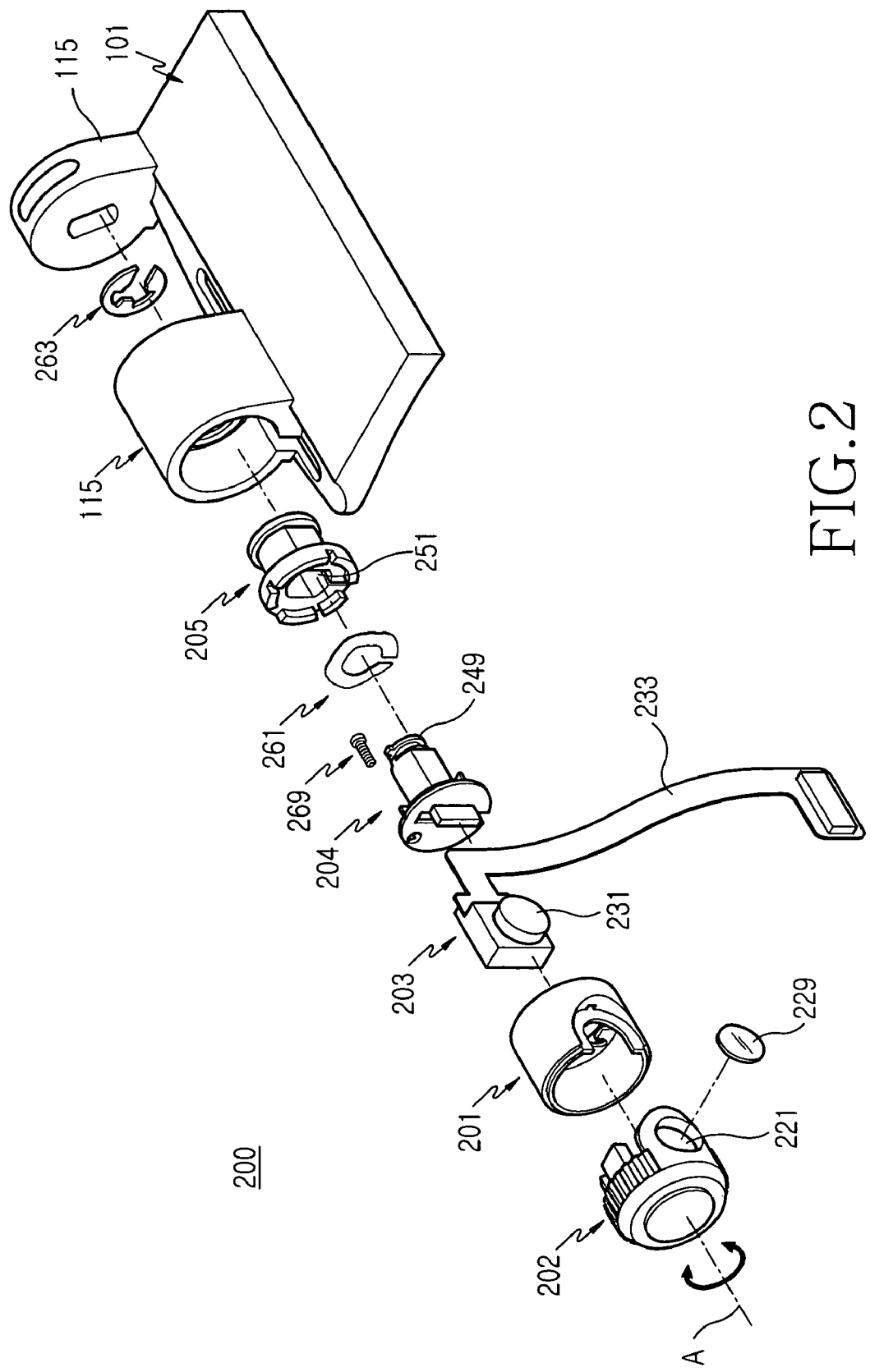
FIG. 2 is an exploded perspective view of the camera lens assembly of the portable terminal illustrated in FIG. 1.
Figure 3:
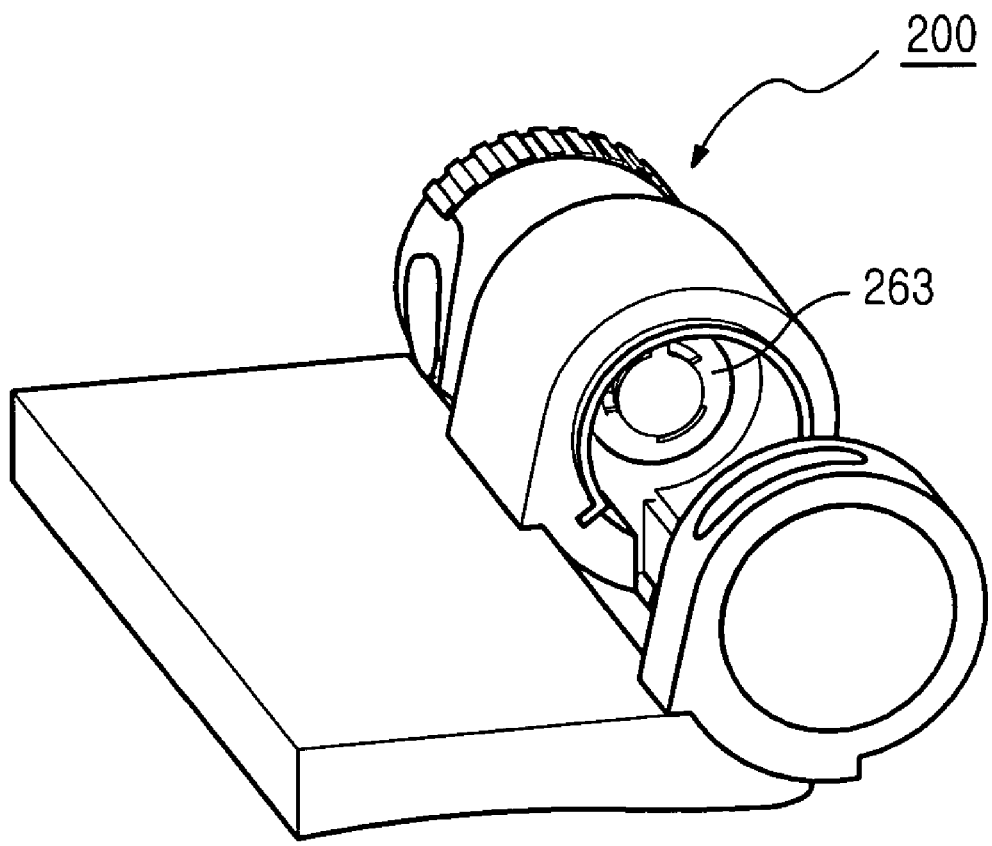
FIG. 3 is an assembled perspective view of the camera lens assembly of the portable terminal illustrated in FIG. 2.

Preferred embodiments of the present invention will be described in detail herein below with reference to the accompanying drawings. In the following description, a detailed description of known functions and configurations incorporated herein will be omitted when it may make the subject matter of the present invention rather unclear.

Referring to FIGS. 4 to 9, a camera lens assembly 400 for a portable terminal according to a preferred embodiment of the present invention comprises a housing 401, a camera holder 402, a bracket 403, a guide plate 404, a bushing 405, a supporting cap 406, and a guide ring 407. The housing 401 is formed in the shape of a cylinder with both ends opened, which has a receiving space 411 defined therein. The receiving space 411 is extended in the longitudinal direction of the housing 401. The camera holder 402, the bracket 403, the guide plate 404, the bushing 405, and the supporting cap 406 are disposed in the receiving space 411 of the housing 401.

The camera holder 402 is also formed in the shape of a cylinder with only one end opened, which has a receiving space 421 defined therein. A camera lens unit (not illustrated) is disposed in the receiving space 421 of the camera holder 402. An exposure opening 423 is formed at a prescribed position on the outer circumferential surface of the camera holder 402. The camera holder 402 is received in one end of the housing 401. The camera holder 402 is linearly movable in the housing 401 by means of a prescribed elastic force while the camera holder 402 is rotatable about the rotating axis A extended in the longitudinal direction of the housing 401. Consequently, the camera holder 402 can be inserted into or drawn out from the housing 401 at one end of the housing 401.

Figure 4:
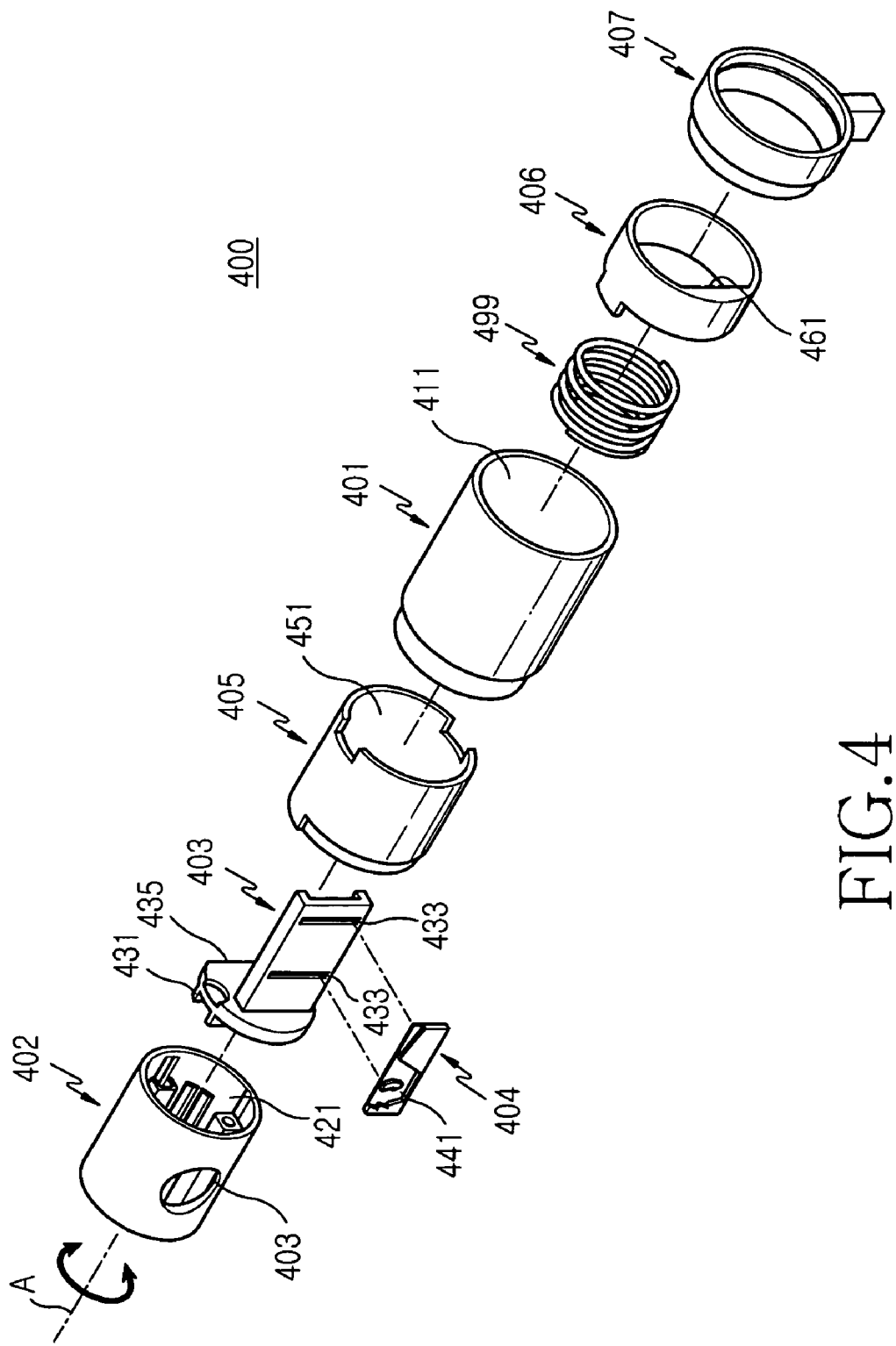
FIG. 4 is an exploded perspective view showing a camera lens assembly for portable terminals according to a preferred embodiment of the present invention.

The bracket 403 is formed in the shape of a plate, which is extended in the direction of the rotating axis A. The bracket 403 is provided at one end thereof with a cover 431 for closing the receiving space 421 of the camera holder 402. At the other end, the bracket 403 is provided with at least one sliding groove 433, which is extended in the direction perpendicular to the rotating axis A. More specifically, a pair of sliding grooves 433 is formed at the side of the bracket 403, as illustrated in FIG. 4.

The cover 431 is fixed to one end of the camera holder 402 for closing the receiving space 421. Since the cover 431 is fixed to the camera holder 402, the bracket 403 can be linearly moved in the housing 401 along with the camera holder 402. Also, the cover 431 is partially cut out to form an opening 435, through which a flexible printed circuit (not illustrated) for connecting the camera lens unit mounted in the camera holder 402 to a main board of the portable terminal passes.

At one side thereof, the guide plate 404 is provided with a guide groove 441, which is formed in the shape of a prescribed figure. At the other side, the guide plate 404 is provided with sliding protrusions (not illustrated) corresponding to the sliding grooves 433 of the bracket 403. As the sliding protrusions are moved in the sliding grooves 433, respectively, the guide plate 404 is linearly moved on the bracket 403 in the longitudinal direction of the sliding grooves 433.

Figure 5:
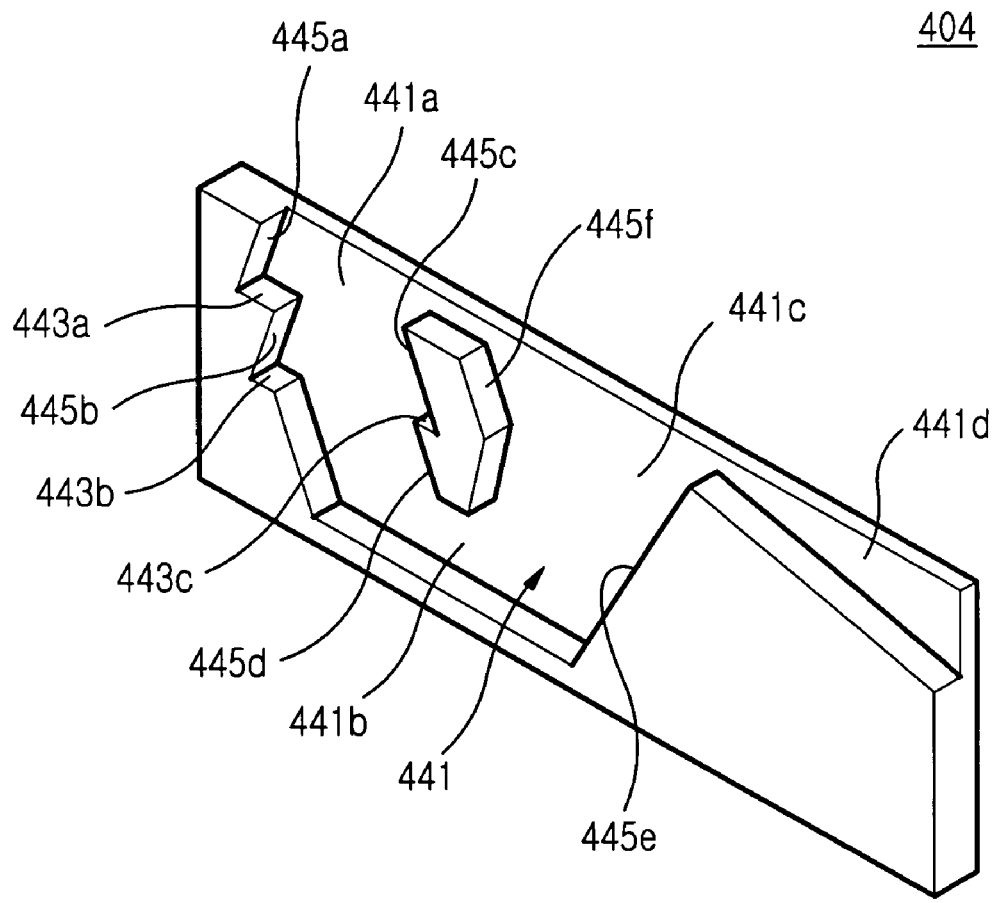
FIG. 5 is a perspective view of the guide plate illustrated FIG. 4.

As illustrated in FIG. 5, the guide groove 441 of the guide plate 404 comprises a first inclined groove 441a, a first sliding groove 441b, a second inclined groove 441c, and a second sliding groove 441d. First and second stopper grooves 443a and 443b, and a third stopper groove 443c, are formed at both sidewalls of the first inclined groove 441a, respectively.

The first inclined groove 441a is extended downward so that it is inclined at a prescribed angle from the position near one end of the guide plate 404. The first sliding groove 441b is extended from the lower end of the first inclined groove 441a in the longitudinal direction of the guide plate 404. The second inclined groove 441c is extended upward so that it is inclined at a prescribed angle from the end of the first sliding groove 441b. The second sliding groove 441d is extended from the upper end of the second inclined groove 441c. The second sliding groove 441d is extended while being inclined at a prescribed angle, although it may be extended in the longitudinal direction of the guide plate 404 like the first sliding groove 441b.

The first and second stopper grooves 443a and 443b are sequentially formed at one sidewall of the first inclined groove 441a in the longitudinal direction of the first inclined groove 441a. The third stopper groove 443c is formed at the other sidewall of the first inclined groove 441a in such a manner that the third stopper groove 443c is opposite to the first and second stopper grooves 443a and 443b.

The bushing 405 is formed in the shape of a cylinder. The cylindrical bushing 405 has a through-hole 451 penetrating both ends thereof in the direction of the rotating axis A. The bushing 405 is disposed in the housing 401 in such a manner that it is rotatable about the rotating axis A. When the camera holder 402 is disposed in the housing 401, the bushing 405 surrounds the outer circumference of the camera holder 402.

The supporting cap 406 is attached to the inside of the other end of the housing 401. A spring 499 is disposed between the supporting cap 406 and the cover 431 of the bracket 403. At the inside of the supporting cap 406 is formed a supporting surface 461, which is opposite to the guide plate 404. On the supporting surface 461 is formed a trapezoidal guide protrusion 463 corresponding to the guide groove 441. As it is slidably moved along the guide groove 441, the guide protrusion 463 is engaged with the first, the second, or the third stopper groove 443a, 443b, or 443c, for stopping the linear movement of the bracket 403, which will be described in more detail with reference to FIGS. 10 to 13. The spring 499 is supported by one end of the supporting surface 461 for applying an elastic force to the camera holder 402 in the direction in which the camera holder 402 is drawn out from the housing 401 at the end of the housing 401.

The guide ring 407 is attached to the other end of the housing 401 so that the camera lens assembly 400 can be mounted in a portable terminal.

Figure 6:
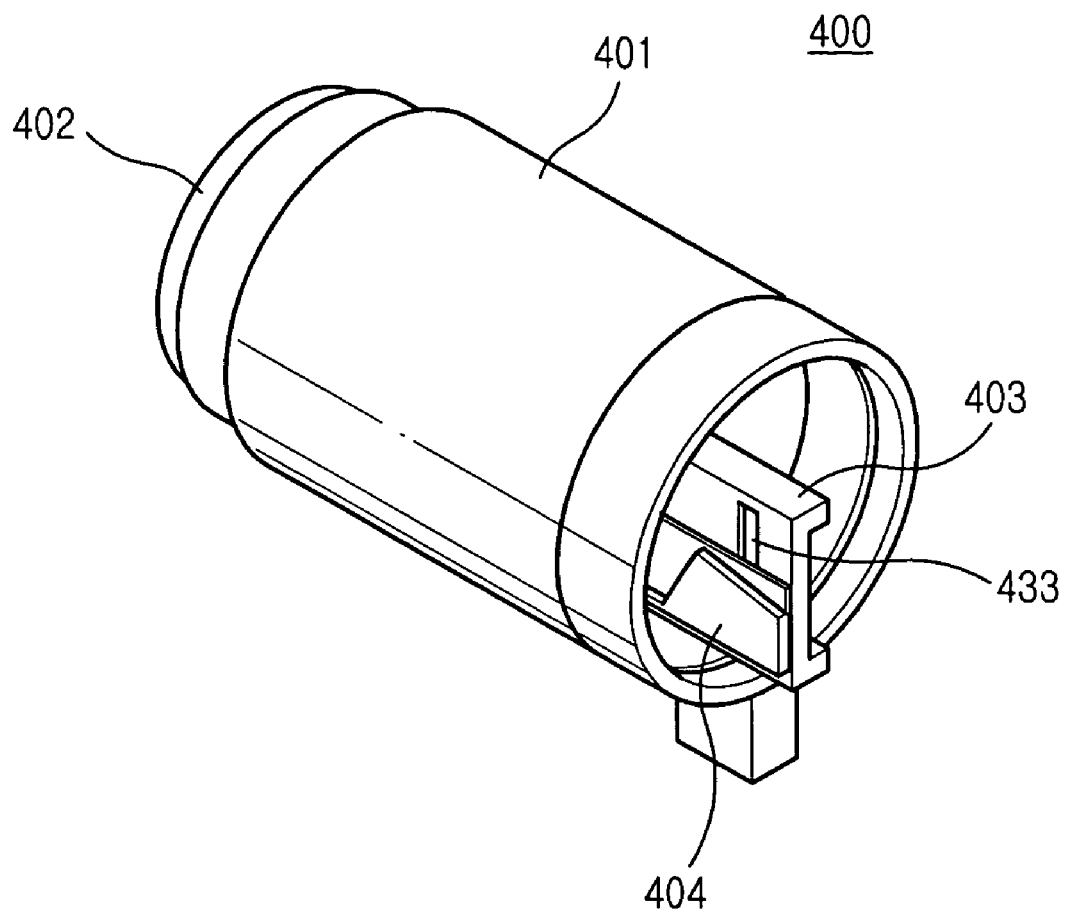
FIG. 6 is an assembled perspective view of the camera lens assembly for portable terminals illustrated in FIG. 4.
Figure 7:
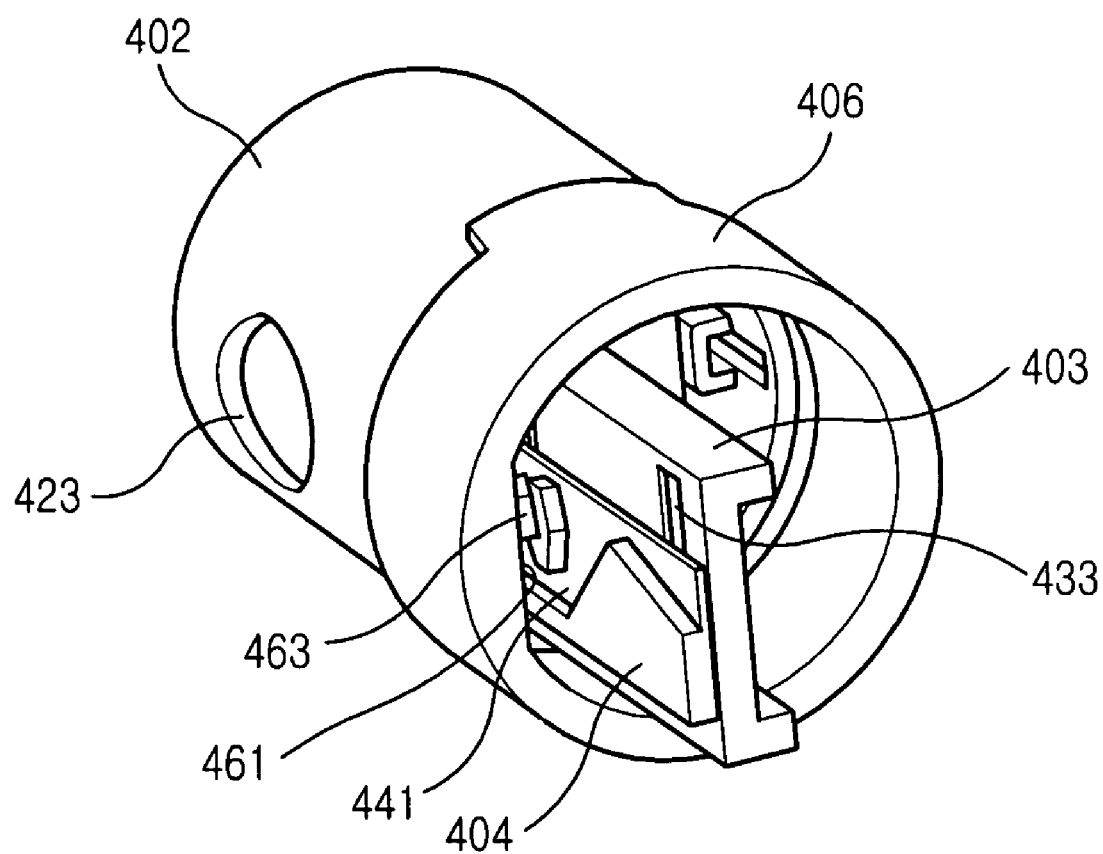
FIG. 7 is a perspective view of the main parts of the camera lens assembly illustrated in FIG. 4.
Figure 8:
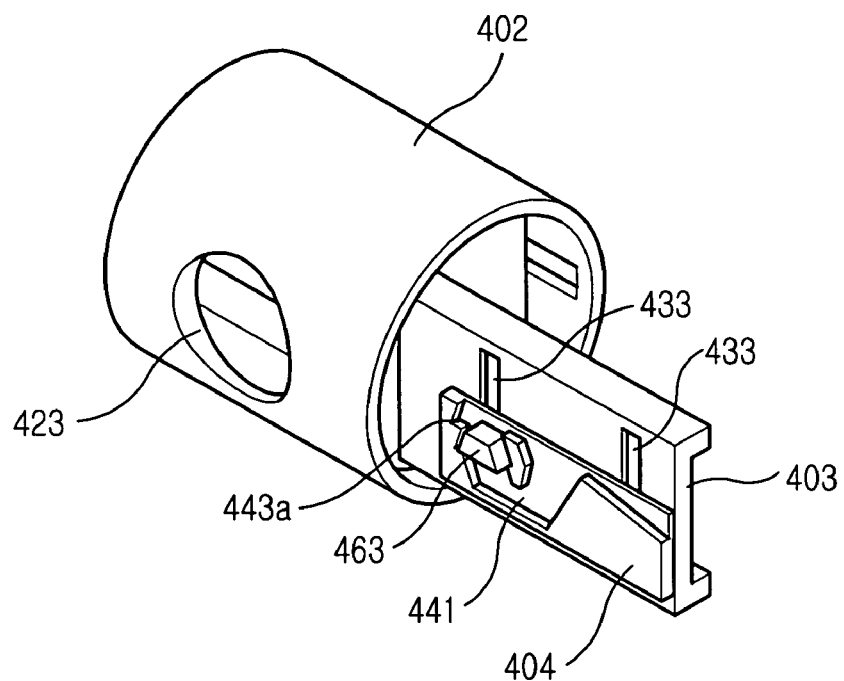
FIG. 8 is another perspective view of the main parts of the camera lens assembly illustrated in FIG. 4.
Figure 9:
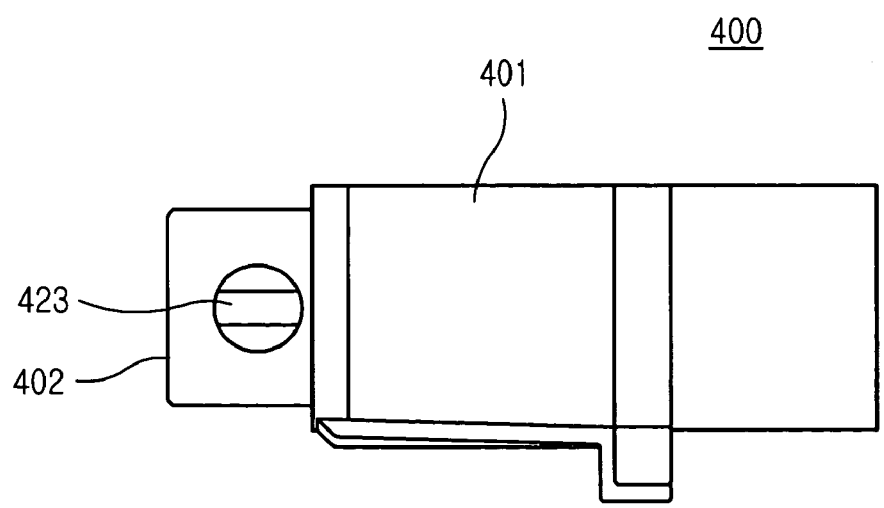
FIG. 9 is a front view of the camera holder drawn out from the housing of the camera lens assembly illustrated in FIG. 4.
Figure 10:
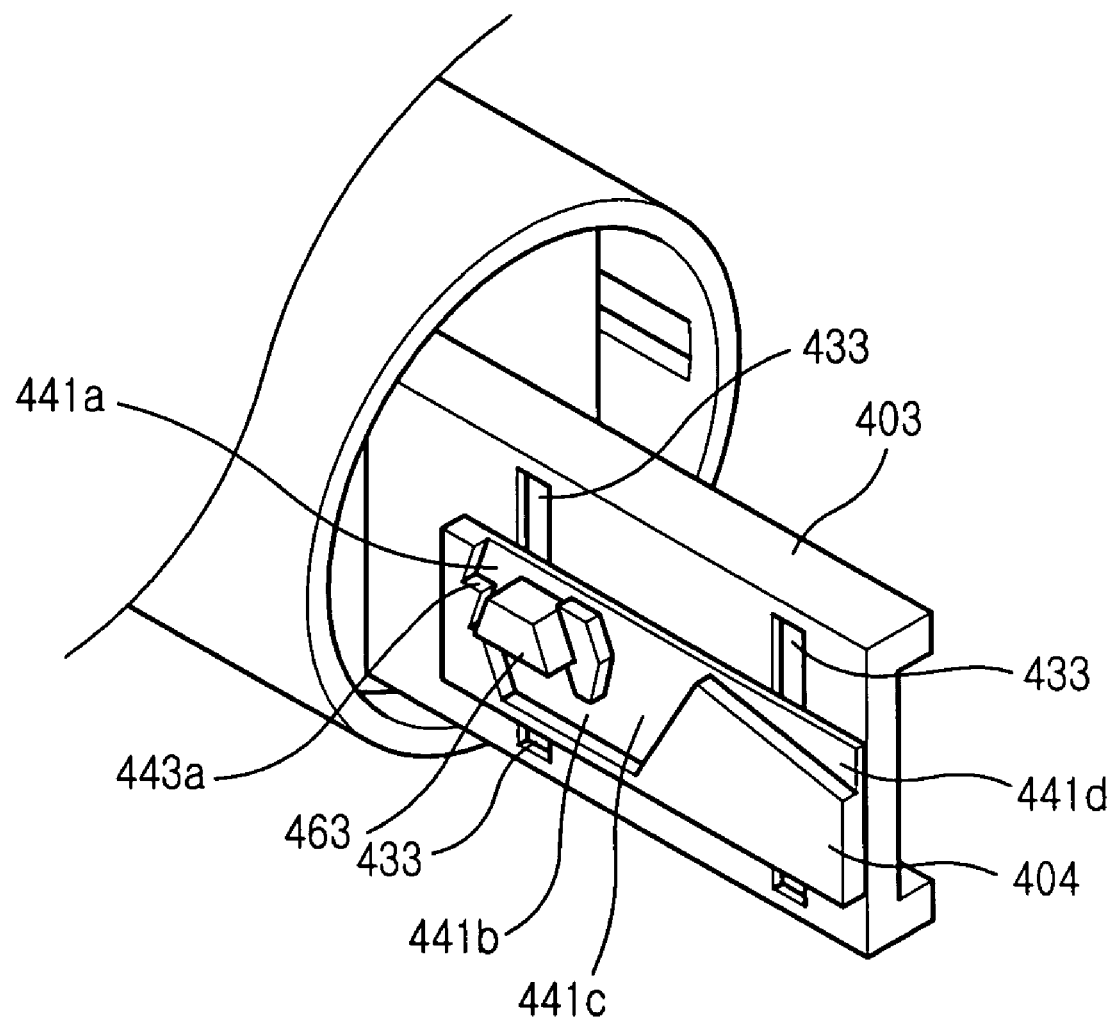
FIGS. 10 to 13 are views respectively illustrating how the camera holder is inserted into or drawn out from the housing of the camera lens assembly illustrated in FIG. 4.

FIG. 6 is an assembled perspective view of the camera lens assembly 400, and FIGS. 7 and 8 are perspective views respectively showing the main components of the camera lens assembly 400 with the camera holder 402 inserted therein. As illustrated in FIG. 6, when the camera holder 402 is disposed in the housing 401, the ends of the bracket 403 and the guide plate 404 are slightly protruded out of the housing 401 through the other end of the housing 401. At this time, an elastic force applied to the camera holder 402 is accumulated in the spring 499 so that the camera holder 402 is drawn out from the housing 401. When the camera holder 402 is disposed in the housing 401, the guide protrusion 463 of the supporting cap 406 is engaged with the third stopper groove 443c of the guide plate 404 as illustrated in FIGS. 7 and 8. When the camera holder is inserted into or drawn out from the housing 401, the guide protrusion 463 is moved in the guide groove 441. Specifically, the guide protrusion 463 is sequentially moved along the first inclined groove 441a, the first sliding groove 441b, the second inclined groove 441c, and the second sliding groove 441d.

FIGS. 10 to 13 are views for respectively illustrating how the camera holder 402 is inserted into or drawn out from the housing 401 of the camera lens assembly 400. Referring to FIGS. 5 and 10 to 13, the guide protrusion 463 is engaged with the third stopper groove 443c while the camera holder 402 is inserted in the housing 401, and the elastic force is applied from the spring 499 to the end of the bracket 403 in the direction in which the camera holder is drawn out from the housing 401. Also, one side of the guide protrusion 463 is in contact with a third inclined surface 445c adjacent to the third stopper groove 443c.

The guide protrusion 463 is moved downward on the guide plate 404 along the third inclined surface 445c by means of the elastic force from the spring 499. At this time, the guide protrusion 463 is engaged with the third stopper groove 443c. The guide protrusion 463 and the guide plate 404 are restrained, and therefore the camera holder 402 can be disposed in the housing 401 even though the elastic force is applied to the camera holder 402 in the direction in which the camera holder is drawn out from the housing 401.

When the end of the camera holder 402 exposed outside the housing 401 is pressed, the guide plate 404 is moved inward into the housing 401 with the result that the guide protrusion 463 is disengaged from the third stopper groove 443c. At this time, the other side of the guide protrusion 463 is moved downward along a second inclined surface 445b adjacent to the second stopper groove 443b so that the guide protrusion 463 is engaged with the second stopper groove 443b.

Figure 11:
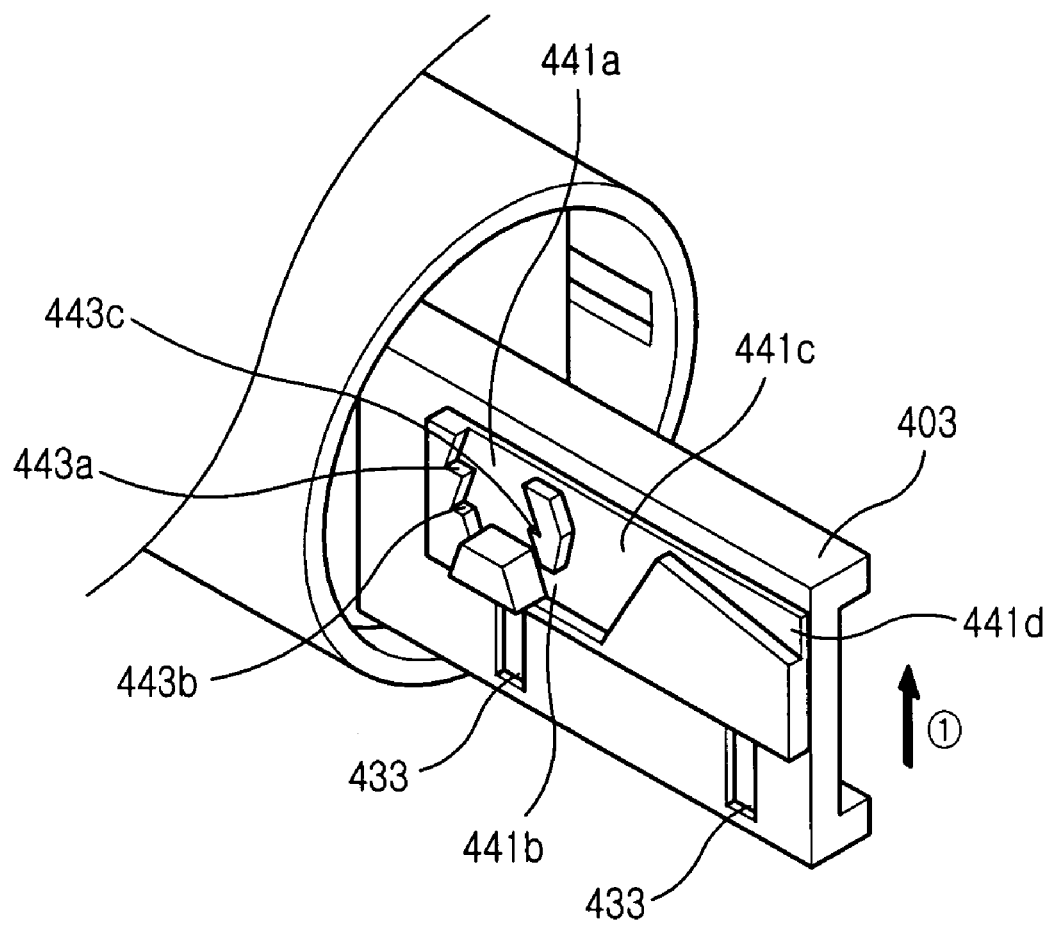

When the force applied to the camera holder is released, the camera holder 402 is moved in the direction in which the camera holder is drawn out form the housing 401 by means of the elastic force from the spring 499, and the guide protrusion 463 is moved along a fourth inclined surface 445d formed in a prescribed section of the first inclined groove 441a. As the guide protrusion 463 is moved along the fourth inclined surface 445d, the guide plate 404 is moved upward in the direction indicated by an arrow ① as illustrated in FIG. 11.

Figure 12:
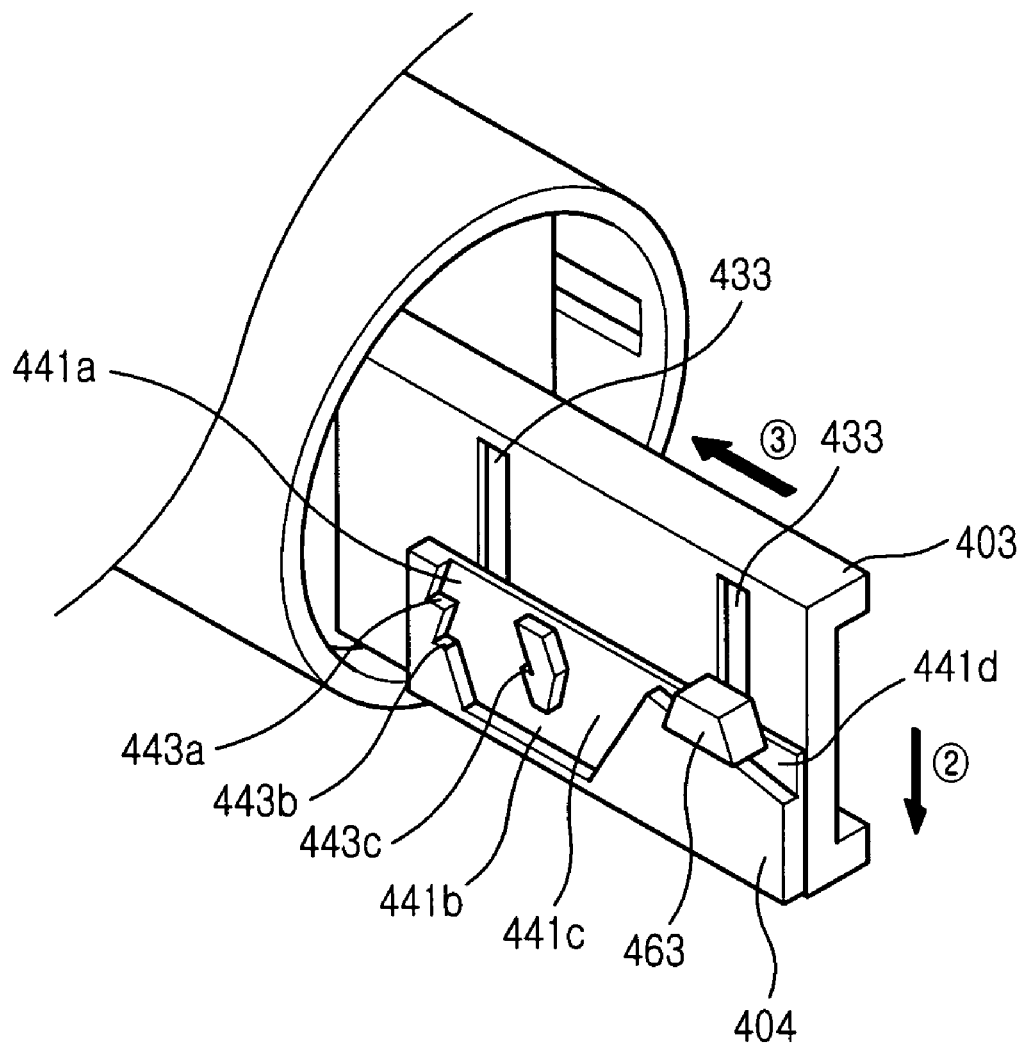
Figure 13:
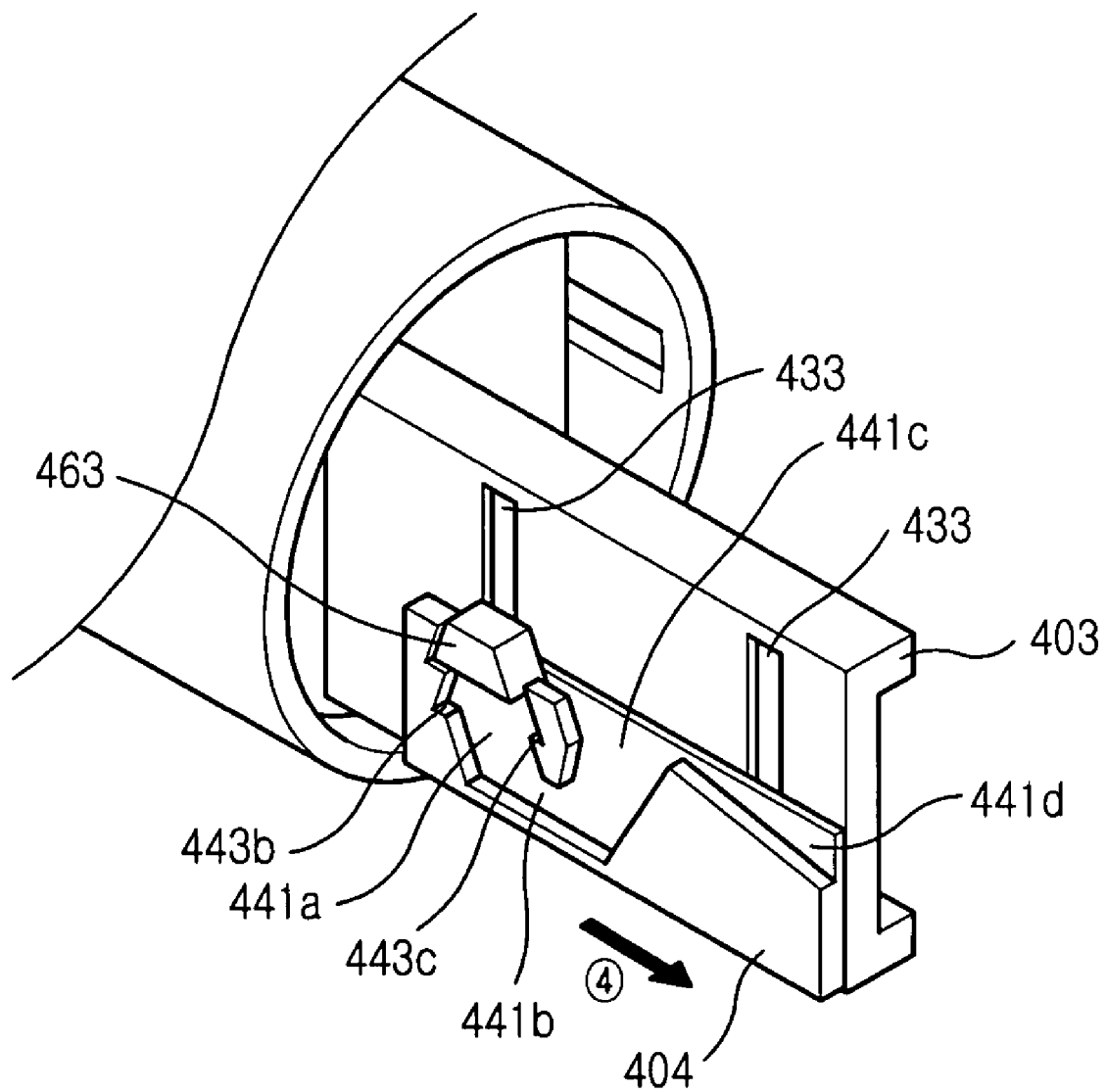
Figure 14:
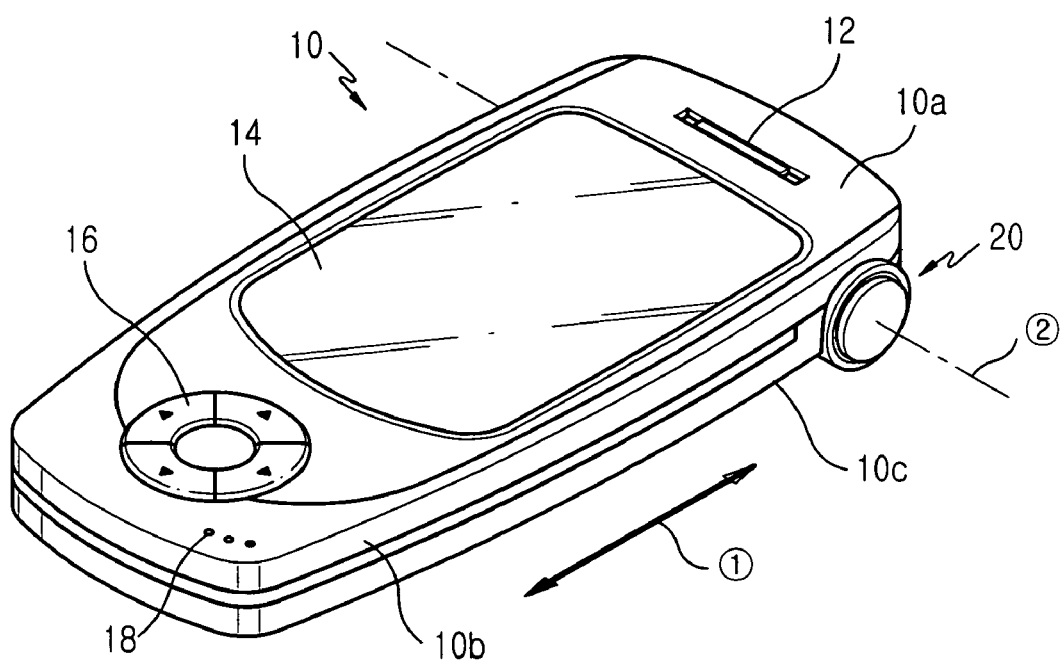
FIG. 14 is a perspective view showing a portable terminal according to another preferred embodiment of the present invention.
Figure 15:
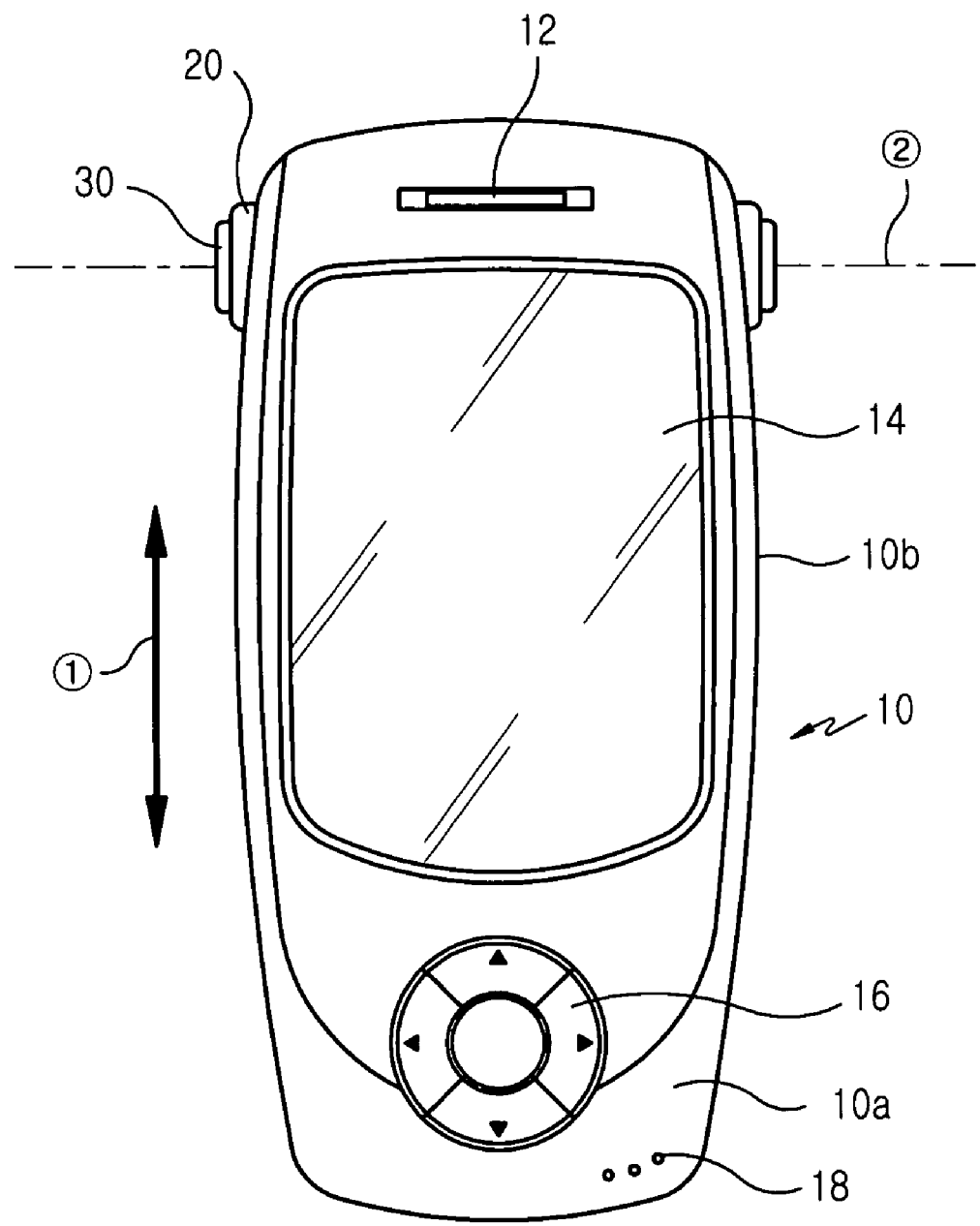
FIG. 15 is a front view of the lens housing of the portable terminal illustrated in FIG. 14.
Figure 16:
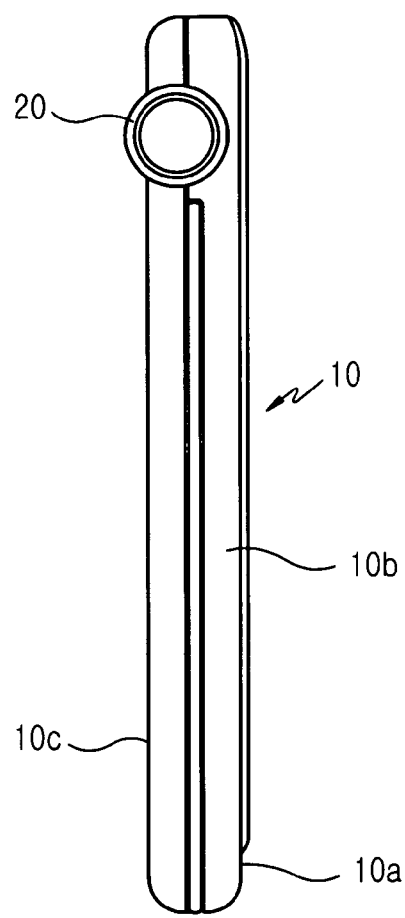
FIG. 16 is a side view of the lens housing of the portable terminal illustrated in FIG. 14.
Figure 17:
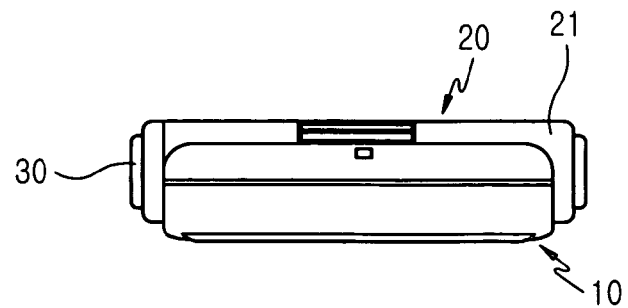
FIG. 17 is a bottom view of the lens housing of the portable terminal illustrated in FIG. 14.

The camera holder 402 is still biased in the direction in which the camera holder 402 is drawn out from the housing by means of the elastic force from the spring 499. Consequently, the camera holder 402 is moved in the direction indicated by an arrow ③ as illustrated in FIG. 12 with the result that the camera holder is drawn out from the housing 401, and the guide protrusion 463 is moved along the first sliding groove 441b and the second inclined groove 441c. At this time, the lower end of one side of the guide protrusion 463 is moved along a fifth inclined surface 445e, by which the second inclined groove is formed, and the guide plate 404 is moved in the direction indicated by an arrow ②.

When pictures are to be taken using the camera lens assembly 400, the camera holder 402 is drawn out from the housing 401 and rotated toward a subject. The camera holder 402 is easily rotated when the camera holder 402 is drawn out from the housing 401.

When the camera holder 402, which is drawn out from the housing 401, is inserted into the housing 401 again, the guide plate 404 is moved in the direction indicated by an arrow ④ (See FIG. 13), and guide protrusion 463 is moved to the inclined groove 441a while being guided along a sixth inclined surface 445f on the second inclined groove 441c, as illustrated in FIG. 12. When the camera holder 402 is continuously inserted into the housing 401, the guide protrusion 463 is moved downward along the first inclined surface 445a formed at one side of the first inclined groove 441a so that the guide protrusion 463 is engaged with the first stopper groove 443a. As a result, the camera holder is no longer inserted into the housing 401, and the camera holder 402 is moved again in the direction in which the camera holder is drawn out from the housing 401 by means of the elastic force from the spring 499. At this time, one side of the guide protrusion 463 is moved along the third inclined surface 445c adjacent to the third stopper groove 443c so that the guide protrusion 463 is engaged with the third stopper groove 443c, and thus the camera holder 402 remains inserted in the housing 401. Consequently, the camera holder 402 is placed in the housing 401 when the guide protrusion 463 is engaged with the third stopper groove 443c.

Referring to FIGS. 14 to 17, a portable terminal according to another preferred embodiment of the present invention comprises a first housing 10 extended in a first direction ①, and a second housing 20 extended in a second direction ②, which is perpendicular to the first direction. Preferably, the second housing 20 is formed at the bottom surface 10c of the first housing 10 in such a manner that a portion of the outer circumferential surface of the second housing 20 is protruded outward from the bottom surface 10c of the first housing 10. In the second housing 20 is mounted a pop-up lens housing 30, which is inserted into or drawn out from the second housing 20 at one side of the second housing 20. The first direction ① is a lengthwise direction along which the first housing 10 is extended, and the second direction ② is a direction perpendicular to the first direction ①. Preferably, the lens housing 30 is rotated about the second direction ②. Also, the lens housing 30 is linearly moved along the second direction ②.

The first housing 10 is formed in the shape of a bar or a plate. The first housing 10 comprises a top surface 10a, a bottom surface 10c, and both side surfaces 10b. A speaker unit 12, a display unit 14, a plurality of keys 16 and a microphone unit 18 are arranged on the top surface 10a of the first housing 10.

The second housing 20 is formed in the shape of a cylinder. Preferably, a portion of the second housing 20 is protruded at a prescribed region of the bottom surface 10c of the first housing 10. Specifically, the second housing 20 is disposed in the shape of a protruded jaw in the vicinity of the upper part of the bottom surface 10c of the first housing 10. Also, the second housing 20 is extended between the side surfaces 10b of the first housing 10 in the second direction ②.

Figure 18:
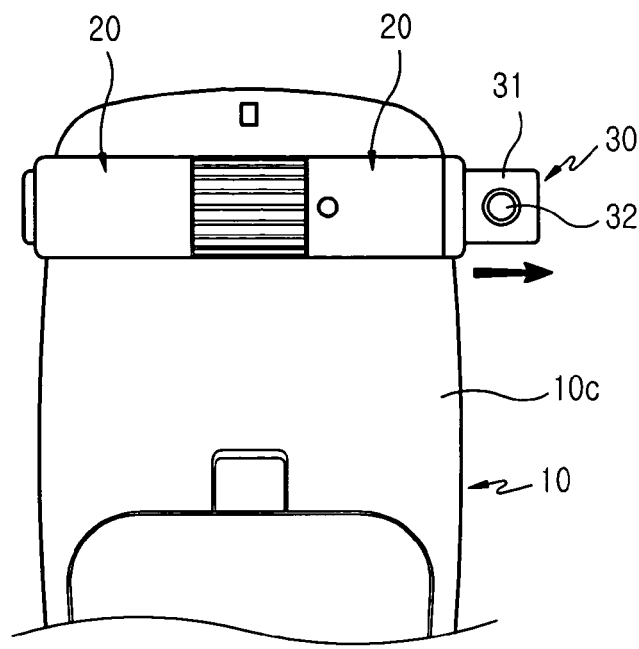
FIG. 18 is a rear view of the lens housing drawn out from the portable terminal illustrated in FIG. 14.
Figure 19:
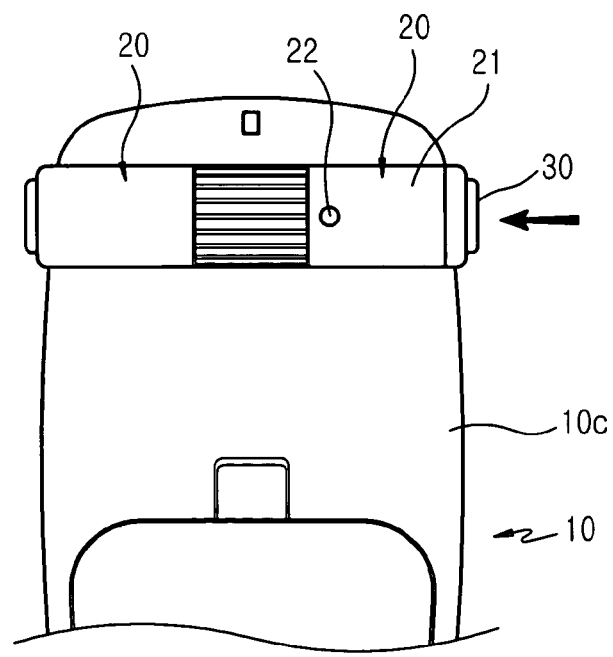
FIG. 19 is a rear view of the lens housing inserted in the portable terminal illustrated in FIG. 14.

As illustrated in FIGS. 18 and 19, the lens housing 30 is formed in the shape of a cylinder so that the lens housing 30 is inserted into or drawn out from the second housing 20 at one side of the second housing 20. Preferably, the lens housing 30 is mounted at one side of the second housing 20 in a pop-up fashion. In case that the lens housing 30 is drawn out from the second housing 20, it is inserted into the second housing by means of a force from a user of the portable terminal. However, when the lens housing 30 is inserted in the second housing 20, it is drawn out from the second housing by means of a force from a user of the portable terminal. More specifically, the lens housing 30 is inserted into or drawn out from the second housing 20 by pushing the lens housing 30. Additionally, it is possible that the lens housing 30 may be inserted into or drawn out from the second housing 20 by rotating the lens housing 30. Further, it is also possible that the lens housing 30 may be automatically inserted into or drawn out from the second housing 20 by means of an additional operating button.

The lens housing 30 has a camera lens 32 mounted at a prescribed region of the outer circumferential surface 31 thereof. When the lens housing 30 is completely drawn out from the second housing 20, the camera lens 32 is also drawn out from the second housing 20.

As described above, the lens housing 30 can be rotated and linearly moved. More specifically, the lens housing 30 can be rotated about the second direction ②, and linearly moved in the second direction ②. The camera lens 32 is turned toward a subject by rotating the lens housing 30. The lens housing 30 is inserted into the second housing 20 by linearly moving the lens housing 30 when it is not in use. Similarly, the lens housing 30 is drawn out from the second housing 20 by linearly moving the lens housing 30 when it is to be used.

As is apparent from the description above, the present invention provides a camera lens assembly for portable terminals comprising a housing and a camera holder wherein the camera holder can be inserted into or drawn out from the housing at one end of the housing. Consequently, an exposure opening formed at the camera holder can be protected from an external shock by means of the housing with the result that the camera holder including the exposure opening is not damaged. Furthermore, after the camera holder is drawn out from the housing, it can be rotated easily and conveniently toward a subject when pictures of the subject are to be taken.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A camera lens assembly for a portable terminal, comprising:
   a cylindrical housing having a receiving space extended in a longitudinal direction thereof;
   a camera holder capable of being inserted into and drawn out from a first end of the cylindrical housing;
   a bracket fixed to an inner end of the camera holder and linearly reciprocated in the cylindrical housing;
   a guide plate linearly reciprocated on the bracket in a direction perpendicular to the longitudinal direction of the bracket, the guide plate having a guide groove formed at a first side thereof;
   a supporting cap attached to a second end of the cylindrical housing and having a guide protrusion formed at an inner circumferential surface thereof, the guide protrusion being slidably moved along the guide groove for stopping the linear movement of the bracket at least once;
   a guide ring attached to the second end of the cylindrical housing, the guide ring for mounting the camera lens assembly in the portable terminal; and
   a spring supported by the supporting cap at one end thereof for applying an elastic force to the camera holder in a direction for drawing out the camera holder from the housing.

2. The camera lens assembly as set forth in claim 1, wherein the camera holder includes an exposure opening for exposing a camera lens.

3. The camera lens assembly as set forth in claim 1, further comprising a cylindrical bushing disposed inside the cylindrical housing for surrounding an outer circumference of the camera holder when the camera holder is placed in the housing.

4. The camera lens assembly as set forth in claim 1, wherein the guide groove comprises:
   a first inclined groove extending downward from a position adjacent to the camera holder;
   a first sliding groove extending from an end of the first inclined groove in the longitudinal direction of the cylindrical housing;
   a second inclined groove extending upward from an end of the first sliding groove; and a second sliding groove extending from an end of the second inclined groove.

5. The camera lens assembly as set forth in claim 4, further comprising: first and second stopper grooves formed at a first sidewall of the first inclined groove, the first and second stopper grooves being adjacent to each other; and a third stopper groove formed at a second sidewall of the first inclined groove, the third stopper groove being opposite to the first and second stopper grooves, wherein the grooves are arranged in an order of the first stopper groove, the third stopper groove, and second stopper groove in the direction perpendicular to the longitudinal direction of the cylindrical housing, and in alternating directions.

6. The camera lens assembly as set forth in claim 5, wherein the guide protrusion engages with the third stopper groove when the camera holder is inserted in the cylindrical housing.

7. The camera lens assembly as set forth in claim 1, further comprising:
- at least one sliding groove formed at a first side of the bracket, the sliding groove extending in a direction perpendicular to the longitudinal direction of the bracket; and
- at least one sliding protrusion formed at a second side of the guide plate, the sliding protrusion corresponding to the sliding groove.

8. The camera lens assembly as set forth in claim 1, wherein the camera holder is rotatable about a rotating axis extended in the longitudinal direction of the cylindrical housing.

9. The camera lens assembly as set forth in claim 1, further comprising a supporting surface opposite to the guide plate at the inside the supporting cap, wherein the guide protrusion is formed on the supporting surface.

10. A portable communication terminal for providing telecommunication services and picture services, comprising:
- a first housing extended in a first direction including a speaker unit, a display unit, a plurality of keys, and a microphone unit arranged on the top surface thereof;
- a second housing extended in a second direction perpendicular to the first direction, the second housing being formed in a shape of a cylinder; and
- a lens housing mounted in the second housing so that the lens housing can be inserted into and drawn out from the second housing at a side of the second housing in the second direction by pushing the lens housing,
- wherein the lens housing can be rotated about a rotating axis extended in the second direction and linearly moved upward and downward when the lens housing is drawn out from the second housing.

* * * * *